(No Model.)
E. D. MEAGHER.
PLOW.
No. 277,315.  Patented May 8, 1883.
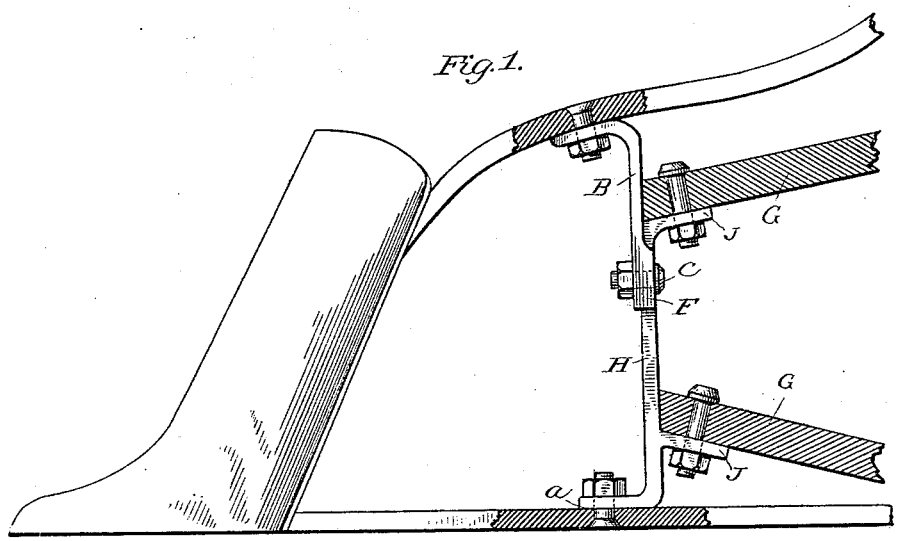
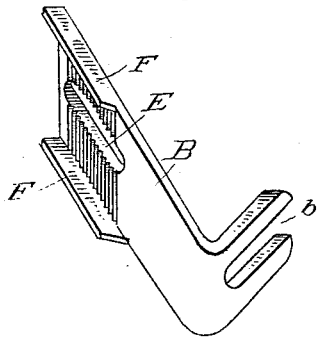
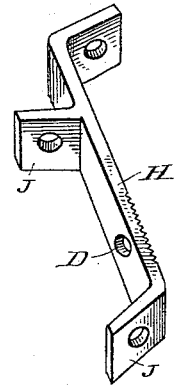
Attest:
Walter Donaldson
L. W. Suly
Inventor:
Edmund D. Meagher
by
Ellis Spear
Atty.

UNITED STATES PATENT OFFICE.

EDMUND D. MEAGHER, OF SOUTH BEND, INDIANA, ASSIGNOR TO THE ECONOMIST PLOW COMPANY, OF SAME PLACE.

PLOW.

SPECIFICATION forming part of Letters Patent No. 277,315, dated May 8, 1883.

Application filed July 14, 1882. (No model.)

*To all whom it may concern:*

Be it known that I, EDMUND D. MEAGHER, of South Bend, in the county of St. Joseph and State of Indiana, have invented a new and useful Improvement in Plows; and I do hereby declare that the following is a full, clear, and exact description of the same.

The object of my invention is to provide an improved method of supporting the mold-board and landside of a plow, securing them to each other, and attaching the handles. The methods commonly employed for this purpose are to bolt the lower ends of the handles to the mold-board and landside, first shaping them to fit the parts named, or to bolt the handles to lugs or ears, which are in turn bolted to said parts. To support the mold-board and landside and prevent their being forced inward, a device known as a "spreading-bolt," consisting of an ordinary threaded bolt and nut having an end projection outside the head, is inserted between the handles and the nut turned up until the head and nut rest solidly against either handle. Both methods are defective and unsafe, especially so if the wearing parts of the plow are made of brittle material, such as chilled or cast iron. The drawing up of the spreading-bolt, being left to the judgment of the fitter and user, may be, and frequently is, the cause of breaking the mold-board or land-side, as a turn too much on the nut strains the parts named, when a slight shock will cause them to give way. The shrinkage of the handles or loosening of the nut on the spreading-bolt leaves the mold-board and landside unsupported and liable to breakage from lateral strain or shocks. Plows the handles of which are bolted direct to the wearing parts are open to the further objection that the cutting away of that part of the timber required to make them fit weakens them at the point where most strength is required.

To overcome the objections named and secure advantages not hitherto attained, I employ the device shown in the accompanying drawings, which form a part of this application.

In these drawings, Figure 1 represents a plan view of a plow with my improvement attached. Figs. 2 and 3 are detached views, enlarged, of the parts composing the brace.

The piece H, which I will call the "foot-brace," is bolted to the landside, as shown at *a*, Fig. 1. The piece B is formed as shown in Fig. 3, and is secured to the mold-board by means of the slot *b*, passing around a bolt, and then screwing a nut down tightly upon it; or it may be secured in any convenient manner. At the end farthest from the mold-board the piece B is provided with flanges F F, which overlap the edge of the piece H, and the pieces are secured together by a bolt, C, passing through a hole, D, in the piece H and a slot, E, in the piece B. The slot is for the purpose of adjusting the parts when required for different sizes of plows, or by the unavoidable variation in the thickness or shape of the mold-board or landside. The faces of the pieces H and B are serrated, as shown, where they come in contact with each other, thereby preventing any lateral movement by slipping should the bolt work loose. The flanges F F, as before said, overlap the edges of the piece H and prevent any vertical movement of the pieces. The parts being bolted in position, as described, the handles G G, fitted against the bar or piece H, are bolted to the lugs J J.

By this device I secure the mold-board and landside firmly together, effectually guarding against the straining or forcing the parts out of their natural position or leaving them unsupported. The slot in the piece B admits of the parts being adjusted to mold-boards and landsides of different thicknesses, or to plows of different sizes having the same general contour at the points of contact.

In fitting the parts together it is only necessary to bolt the two parts of the divided brace to their respective sides and then pass the bolt through their overlapping ends, bolting them securely in the position in which they happen to come, the slot permitting the bolt to unite the parts even when there is considerable variation in thickness of the landside or mold-board. Both handles being bolted to the brace, and neither resting against nor bolted directly to the mold-board or landside, cannot weaken the supports of the latter through shrinkage of the timber or loosening of the handle-bolts.

A further advantage arising from the use of this device is that, the supports to the wearing parts of the plow being rigid, secure, and not liable to become loose or cause strain, thinner and lighter parts can be used and greater strength secured than if the parts were made heavier and improperly supported.

I do not confine myself to the specific forms shown for securing the parts to each other, or for preventing lateral or vertical movement of the parts, but may modify and vary the same and employ any obviously equivalent forms or methods.

I am aware that divided braces have been heretofore known in connection with laterally-adjustable parts of plows and like instruments; and I do not broadly claim such a brace.

Having thus described my invention, what I claim is—

1. In a plow, the combination of the mold-board, the landside, two-part adjustable spreading-braces B H, provided with lugs J, and the handles secured centrally to the said braces.

2. The adjustable two-part braces B H, with lugs J for handle attachment, connecting the mold-board and landside, and having the serrated meeting faces and the connecting-bolt.

3. In combination with the rigid landside and mold-board of a plow, a divided brace, one part connected to the landside and the other to the mold-board, said divided brace being provided with handle-seats, and having overlapping ends and slot, and being connected by bolt, all as and for the purposes set forth.

In testimony whereof I have signed my name to this specification in the presence of two subscribing witnesses.

EDMUND D. MEAGHER.

Witnesses:
ADAM LITTLE,
JOHN M. CHAPMAN.